US010917028B2

(12) United States Patent
Zhou et al.

(10) Patent No.: US 10,917,028 B2
(45) Date of Patent: Feb. 9, 2021

(54) MOTOR DRIVING CONTROL DEVICE AND MOTOR DRIVING CONTROL METHOD

(71) Applicant: MINEBEA MITSUMI Inc., Nagano (JP)

(72) Inventors: Xiao Zhou, Kitasaku-gun (JP); Hiroyuki Kaidu, Kakegawa (JP); Masato Aoki, Iwata (JP); Mitsunari Terada, Mito (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 16/509,679

(22) Filed: Jul. 12, 2019

(65) Prior Publication Data

US 2020/0028457 A1 Jan. 23, 2020

(30) Foreign Application Priority Data

Jul. 20, 2018 (JP) .................................. 2018-137123

(51) Int. Cl.
*H02P 6/22* (2006.01)
*H02P 6/15* (2016.01)

(52) U.S. Cl.
CPC ................ *H02P 6/22* (2013.01); *H02P 6/157* (2016.02)

(58) Field of Classification Search
CPC ............ H02P 6/22; H02P 6/157; H02P 6/182
USPC ....................................................... 318/400
See application file for complete search history.

(56) References Cited

U.S. PATENT DOCUMENTS

| 6,388,416 | B1* | 5/2002 | Nakatani | H02P 6/085 |
| | | | | 318/700 |
| 9,306,482 | B2* | 4/2016 | Siddalingappa | H02P 21/32 |
| 9,391,552 | B2* | 7/2016 | Siddalingappa | B60L 50/51 |
| 2011/0194166 | A1* | 8/2011 | Varnham | H01S 3/2383 |
| | | | | 359/279 |
| 2013/0187588 | A1* | 7/2013 | Nakata | H02P 27/06 |
| | | | | 318/430 |
| 2015/0084558 | A1* | 3/2015 | Benson | H02P 6/182 |
| | | | | 318/400.13 |
| 2015/0326154 | A1* | 11/2015 | Benson | B60L 3/003 |
| | | | | 318/139 |

(Continued)

FOREIGN PATENT DOCUMENTS

JP 2004-140962 A 5/2004

*Primary Examiner* — Eduardo Colon Santana
*Assistant Examiner* — Devon A Joseph
(74) *Attorney, Agent, or Firm* — Pearne & Gordon LLP

(57) ABSTRACT

A motor driving control device has a motor driving unit configured to selectively energize coils with a plurality of phases of a motor, a control circuit unit configured to control an operation of the motor driving unit by outputting a driving control signal to the motor driving unit, and a position detector configured to output a position signal which corresponds to any one phase of the plurality of phases and a phase of which changes depending on a position of a rotor of the motor. the control circuit unit detects a transition of values of a back electromotive force induced in the one phase in a detection period corresponding to a change timing of the position signal when beginning to start up the motor, and determines a rotational state of the motor including a rotational direction of the motor based on a detection result of the transition of the values of the back electromotive force.

6 Claims, 11 Drawing Sheets

(56) References Cited

U.S. PATENT DOCUMENTS

2016/0087559 A1* 3/2016 Lin ................. H02P 6/182
                                                                                               318/490

2016/0233812 A1* 8/2016 Lee ................. H02P 6/16

* cited by examiner

MOTOR DRIVING CONTROL DEVICE AND MOTOR DRIVING CONTROL METHOD

CROSS REFERENCE TO RELATED APPLICATIONS

This application claims the benefit of Japanese Patent Application No. 2018-137123, filed Jul. 20, 2018, which is hereby incorporated by reference in its entirety.

BACKGROUND

Technical Field

The present disclosure is related to a motor driving control device and a motor driving control method, and particularly to a motor driving control device capable of performing so-called single sensor driving and a motor driving control method.

Background

Examples of a motor driving control device which controls driving of a motor include one which drives a motor by so-called single sensor driving using only one sensor for detecting a magnetic pole position of a rotor. An example is a motor driving control device which drives a motor using only one hall sensor for detecting a magnetic pole position of a motor.

If the motor is driven by single sensor driving, the magnetic pole position cannot be specified, unlike when a plurality of sensors are used. Accordingly, a method for locking the rotor before starting startup control and starting startup after locking the rotor is adopted. The locking of the rotor is a control operation for positioning the rotor at a predetermined position.

Japanese Patent Application Laid-Open No. 2004-140962 describes a configuration of a fan motor driving control device using only one sensor for detecting a magnetic pole position of a rotor. In the fan motor driving control device, brake control for positioning the rotor at a predetermined position by subjecting one switching element on either one of the positive voltage side and the negative voltage side of an inverter circuit and two switching elements on the other voltage side to PWM (Pulse Width Modulation) energization based on an output signal of the magnetic pole position detection sensor before starting up a brushless motor is performed.

In single sensor driving, when an abnormal state such as a state where an external load is applied to a rotary shaft of a motor before the driving so that the rotary shaft is rotating backward has occurred, a problem may occur.

A specific example will be described. A state where a load for rotating a fan backward is applied in a fan motor so that the fan motor is forcedly rotated backward may occur. For example, a fan motor which has not been driven may forcedly rotate in an opposite direction to a rotation instruction direction due to strong outside wind depending on a usage environment. In an apparatus provided with a plurality of fan motors, the fan motor which has not been driven may forcedly rotate backward because a difference between atmospheric pressures inside and outside the apparatus increases due to an effect of the other fan motor, which is being driven. When the motor which is thus rotating backward is started up, a rotary shaft cannot be rotated forward by torque at the time of startup so that a state where the motor forcedly rotates backward may be continued as it is.

When the motor is thus in the abnormal state, the startup of the motor may be able to be stopped by detecting the abnormal state. However, in a single sensor driving system, it may be unable to be detected that the motor is in the abnormal state.

SUMMARY

The present disclosure is related to providing a motor driving control device capable of quickly and reliably starting up a motor by detecting an abnormal state of the motor and a motor driving control method.

According to a first aspect of the present disclosure, there is provided a motor driving control device including a motor driving unit configured to selectively energize coils with a plurality of phases of a motor, a control circuit unit configured to control an operation of the motor driving unit by outputting a driving control signal to the motor driving unit, and a position detector configured to output a position signal which corresponds to any one phase of the plurality of phases and a phase of which changes depending on a position of a rotor of the motor, in which the control circuit unit detects a transition of values of a back electromotive force induced in the one phase in a detection period corresponding to a change timing of the position signal when beginning to start up the motor, and determines a rotational state of the motor including a rotational direction of the motor based on a detection result of the transition of the values of the back electromotive force.

Preferably, the control circuit unit sets the detection period such that a length of the detection period becomes a length corresponding to a cycle of the position signal.

Preferably, the control circuit unit sets the detection period to start after the change timing of the position signal and end before a time period equal to one-fourth of the cycle of the position signal elapses.

Preferably, the control circuit unit sets an average value of a continuous plurality of cycles of the position signal to the cycle of the position signal.

Preferably, the control circuit unit detects the transition of the values of the back electromotive force in each of a plurality of different detection periods when beginning to start up the motor, and determines a rotational state of the motor based on a detection result of the transition of the values of the back electromotive force in each of the plurality of different detection periods.

Preferably, the control circuit unit determines whether the motor is rotating forward, is rotating backward, or is neither rotating forward nor rotating backward based on whether the values of the back electromotive force tend to increase, tend to decrease, or neither tend to increase nor tend to decrease in the detection period.

Preferably, the control circuit unit determines a driving control method subsequently performed based on a determination result of the rotational state of the motor.

Preferably, the control circuit unit includes a timing signal generation unit configured to generate a signal representing a timing at which values of the back electromotive force are detected in response to the position signal, a voltage detection unit configured to detect the back electromotive force at the timing corresponding to the signal generated by the timing signal generation unit, a voltage transition calculation unit configured to perform, based on values of the back electromotive force detected a plurality of times by the voltage detection unit in the detection period, calculation relating to a transition of the values of the back electromotive force, an energization system command unit configured to subsequently issue a command relating to an energization system to the coils with the plurality of phases based on a calculation result of the voltage transition calculation unit, and an energization signal generation unit configured to generate the driving control signal based on the command by the energization system command unit.

According to a second aspect of the present disclosure, there is provided a driving control method for a motor having coils with a plurality of phases, the motor driving control method including a back electromotive force detection step for detecting, in a detection period corresponding to a change timing of a position signal which corresponds to any one phase of the plurality of phases and a phase of which changes depending on a position of a rotor of the motor, a transition of values of a back electromotive force induced in the one phase, and a rotational state determination step for determining a rotational state of the motor including a rotational direction of the motor based on a detection result of the back electromotive force detection step.

According to the present disclosure, there can be provided a motor driving control device capable of quickly and reliably starting up a motor by detecting an abnormal state of the motor and a motor driving control method.

DETAILED DESCRIPTION

A motor driving control device according to an embodiment of the present disclosure will be described below.

EMBODIMENTS

Figure 1:
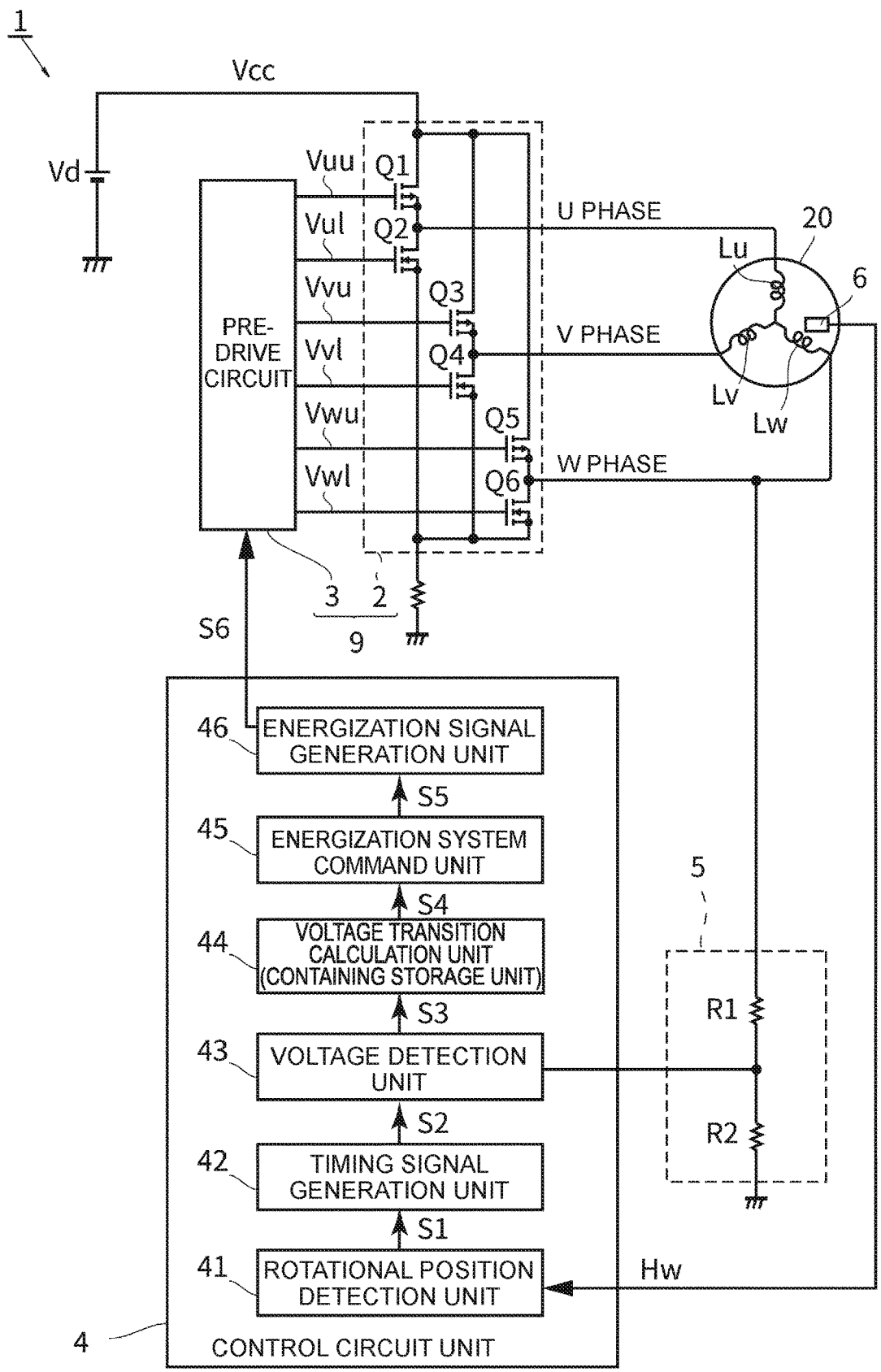
FIG. 1 is a diagram illustrating a configuration of a motor driving control device according to an embodiment of the present disclosure.

FIG. 1 is a diagram illustrating a configuration of a motor driving control device 1 according to an embodiment of the present disclosure.

As illustrated in FIG. 1, the motor driving control device 1 includes a control circuit unit 4, a voltage dividing circuit 5, a position detector 6, and a motor driving unit 9. The motor driving control device 1 supplies driving power to a motor 20 to drive the motor 20. The motor 20 in the present embodiment is a three-phase motor including coils Lu, Lv, and Lw, respectively, with a U phase, a V phase, and a W phase.

The position detector 6 outputs a position signal which corresponds to any one phase of a plurality of phases of the motor 20 and a phase of which changes depending on a position of a rotor of the motor 20. More specifically, the position detector 6 is a magnetic sensor such as a hall element or a hall IC (integrated circuit), and outputs a hall signal as the position signal. The position signal outputted from the position detector 6 is inputted to the control circuit unit 4. The position detector 6 detects the position of the rotor in one portion of the motor 20, and outputs the position signal. The position signal changes from Low to High (a rise; a leading edge) when the rotor has passed through a predetermined position (the rotor has reached a first rotational position) and returns from High to Low (a fall; a trailing edge) when the rotor has passed through another predetermined position (the rotor has reached a second rotational position) while the rotor is rotating once. The position signal is a signal which periodically enters High and Low depending on the rotation of the rotor. The position detector 6 corresponds to any one phase of the U phase, the V phase, and the W phase of the motor 20. That is, each of the first rotational position and the second rotational position is a position corresponding to any one phase of the phases of the motor 20. The position signal is a signal whose phase changes depending on the position of the rotor, i.e., depending on a positional relationship between any one phase of the phases of the motor 20 and the rotor.

In the present embodiment, the one position detector 6 corresponding to the coil Lw with the phase W is provided, for example, to output a position signal Hw the phase of which changes depending on a change in the W phase by rotation of the rotor. As the position signal Hw, a signal which periodically repeats High and Low may be directly outputted from the position detector 6, or an analog position signal Hw outputted from the position detector 6 may be converted into a signal which periodically reaches High and Low after being inputted to the control circuit unit 4 (the signal into which the analog position signal Hw has been thus converted is also referred to as a position signal Hw in the following description).

In the present embodiment, only one position detector 6 is provided. That is, the position signal Hw detected in only one portion of the motor 20 is inputted to the control circuit unit 4. A plurality of position detectors 6 respectively corresponding to a plurality of phases are provided, and a position signal outputted from only the position detector 6 in one portion may be inputted to the control circuit unit 4 and used. In the present embodiment, the position signal Hw outputted from the one position detector 6 is inputted to the control circuit unit 4. The motor driving control device 1 drives the motor 20 by a single sensor system using only one position detector 6 for detecting the position of the rotor.

The motor driving unit 9 selectively energizes the coils Lu, Lv, and Lw with the plurality of phases of the motor 20. The motor driving unit 9 includes an inverter circuit 2 and a pre-drive circuit 3. The motor driving unit 9 receives a driving control signal S6 outputted from the control circuit unit 4.

The inverter circuit 2 selectively energizes the coils Lu, Lv, and Lw with the three phases of the motor 20 based on six types of driving signals Vuu, Vul, Vvu, Vvl, Vwu, and Vwl outputted from the pre-drive circuit 3, to control rotation of the motor 20.

In the present embodiment, the inverter circuit 2 includes six switching elements Q1 to Q6 for supplying a driving current to each of the coils Lu, Lv, and Lw of the motor 20. The switching elements Q1, Q3, and Q5 are each a high-side switching element composed of a MOSFET (metal-oxide-semiconductor field effect transistor) on a P channel arranged on the side of a positive pole of a direct current power supply Vcc. The switching elements Q2, Q4, and Q6 are each a low-side switching element composed of a MOSFET on an N channel arranged on the side of a negative pole of the direct current power supply Vcc. In each of a combination of the switching elements Q1 and Q2, a combination of the switching elements Q3 and Q4, and a combination of the switching elements Q5 and Q6, the two switching elements are connected in series. The three sets of series circuits are connected in parallel, constituting a bridge circuit. A connection point of the switching elements Q1 and Q2 is connected to the coil Lu with the U phase, a connection point of the switching elements Q3 and Q4 is connected to the coil Lv with the V phase, and a connection point of the switching elements Q5 and Q6 is connected to the coil Lw with the W phase.

The pre-drive circuit 3 includes a plurality of output terminals connected to respective gate terminals of the six switching elements Q1 to Q6 in the inverter circuit 2. The driving signals Vuu, Vul, Vvu, Vvl, Vwu, and Vwl are respectively outputted from the output terminals to control ON/OFF operations of the switching elements Q1 to Q6. The driving control signal S6 outputted from the control circuit unit 4 is inputted to the pre-drive circuit 3. The pre-drive circuit 3 outputs the driving signals Vuu, Vul, Vvu, Vvl, Vwu, and Vwl based on the driving control signal S6, to operate the inverter circuit 2. That is, the inverter circuit 2 selectively energizes the respective coils Lu, Lv, and Lw with the phases of the motor 20 based on the driving control signal S6.

The voltage dividing circuit 5 is provided between an energization line to the W phase and a ground (a ground potential) in the present embodiment. The voltage dividing circuit 5 is configured by connecting two resistors R1 and R2 in series. One end of the resistor R1 is connected to the energization line to the W phase. Another end of the resistor R1 is connected to one end of the resistor R2, and another end of the resistor R2 is connected to the ground. A potential between the resistor R1 and the resistor R2 is inputted to the control circuit unit 4. That is, a potential corresponding to a potential on the energization line to the W phase is inputted to the control circuit unit 4. When the energization by the motor driving unit 9 has not been performed, a potential corresponding to a back electromotive force generated on the coil Lw with the W phase is inputted to the control circuit unit 4.

The control circuit unit 4 outputs the driving control signal S6 to the motor driving unit 9 to control an operation of the motor driving unit 9. The control circuit unit 4 outputs the driving control signal S6 to the motor driving unit 9, to switch energization phases of the coils Lu, Lv, and Lw with the plurality of phases in a predetermined order. Although the control circuit unit 4 can be configured using a programmable device such as a DSP (digital signal processor), an FPGA (field programmable gate array), or a microcomputer, the present disclosure is not limited thereto.

The control circuit unit 4 includes a rotational position detection unit 41 and an energization signal generation unit 46. The control circuit unit 4 includes a timing signal generation unit 42, a voltage detection unit 43, a voltage transition calculation unit 44, and an energization system command unit 45.

The position signal Hw is inputted to the rotational position detection unit 41. The rotational position detection unit 41 outputs a position detection signal S1 in response to the leading edge or the trailing edge of the position signal Hw, for example. The position detection signal S1 is inputted to the timing signal generation unit 42.

The energization signal generation unit 46 generates the driving control signal S6, and outputs the generated driving control signal S6 to the pre-drive circuit 3. At the time of normal driving of the motor 20, the energization signal generation unit 46 generates the driving control signal S6 based on a speed command signal inputted from an apparatus outside the motor driving control device 1 such that the motor 20 rotates in the number of rotations corresponding to the speed command signal. The energization signal generation unit 46 generates the driving control signal S6 in response to the position detection signal S1 outputted from the rotational position detection unit 41, for example. That is, the driving control signal S6 is generated based on the position signal Hw and the speed command signal which are inputted to the control circuit unit 4. The speed command signal may be a signal generated within the motor driving control device 1.

Here, the control circuit unit 4 performs, when it begins to start up the motor 20, a startup start operation, as described below.

That is, as will be described later in further detail, the control circuit unit 4 detects, when it begins to start up the motor 20, a transition of values of a back electromotive force induced in one phase (i.e., the W phase in the present embodiment) in a detection period corresponding to a change timing of the position signal Hw (a back electromotive force detection step). The control circuit unit 4 determines a rotational state of the motor 20 including a rotational direction of the motor 20 based on a detection result of the transition of the values of the back electromotive force (a rotational state determination step). The control circuit unit 4 determines whether the motor 20 is rotating forward, is rotating backward, or is neither rotating forward nor rotating backward based on whether the values of the back electromotive force tend to increase, tend to decrease, or neither tend to increase nor tend to decrease in the detection period. The control circuit unit 4 determines a driving control method subsequently performed based on a determination result of the rotational state of the motor 20.

The startup start operation is performed when each of the units in the control circuit unit 4 operates, as described below.

The timing signal generation unit 42 generates a timing signal S2 representing a timing at which the back electromotive force is detected in response to the position signal Hw. That is, the timing signal generation unit 42 generates the timing signal S2 based on the position detection signal S1 outputted from the rotational position detection unit 41, and outputs the generated timing signal S2 to the voltage detection unit 43.

The potential corresponding to the potential on the energization line to the W phase is inputted from the voltage dividing circuit 5 to the voltage detection unit 43. When the energization by the motor driving unit 9 has not been performed, the voltage detection unit 43 detects values of the back electromotive force in the W phase at a timing corresponding to the timing signal S2 generated by the timing signal generation unit 42. In the present embodiment, the back electromotive force in the W phase is detected a plurality of times (e.g., four times) in the detection period corresponding to the change timing of the position signal Hw, to acquire back electromotive force values V1, V2, V3, and V4, as described below. A detection result is outputted as detection voltage information S3 to the voltage transition calculation unit 44.

The voltage transition calculation unit 44 performs, based on the back electromotive force values V1, V2, V3, and V4 acquired by the detection performed a plurality of times by the voltage detection unit 43 in the detection period, calculation relating to a transition of the back electromotive force values V1, V2, V3, and V4. The voltage transition calculation unit 44 includes a storage unit as a memory, for example. The storage unit stores the back electromotive force values V1, V2, V3, and V4 based on the detection voltage information S3 outputted from the voltage detection unit 43. The voltage transition calculation unit 44 performs calculation for comparing the stored back electromotive force values V1, V2, V3, and V4, for example, to output a calculation result as calculation information S4 to the energization system command unit 45.

The energization system command unit 45 issues a command relating to a subsequent driving control method, i.e., an energization system for energizing the coils Lu, Lv, and Lw with the plurality of phases based on the calculation result of the voltage transition calculation unit 44, i.e., the calculation information S4. That is, the energization system command unit 45 outputs to the energization signal generation unit 46 energization command information S5 representing an energization system corresponding to a calculation result of the back electromotive force values V1, V2, V3, and V4, as described below.

The energization signal generation unit 46 generates, when it begins to start up the motor 20, the driving control signal S6 based on the command issued by the energization system command unit 45, i.e., the energization command information S5. When the startup of the motor 20 is started, the driving control signal S6 is thus generated. Therefore, the coils Lu, Lv, and Lw of the motor 20 are energized using the energization system set based on the back electromotive force values V1, V2, V3, and V4 detected at the timing based on the timing signal S2. After the energization at the time of starting the startup is performed, the energization signal generation unit 46 generates the driving control signal S6 based on the speed command signal, as described above, to perform normal driving of the motor 20.

Figure 2:
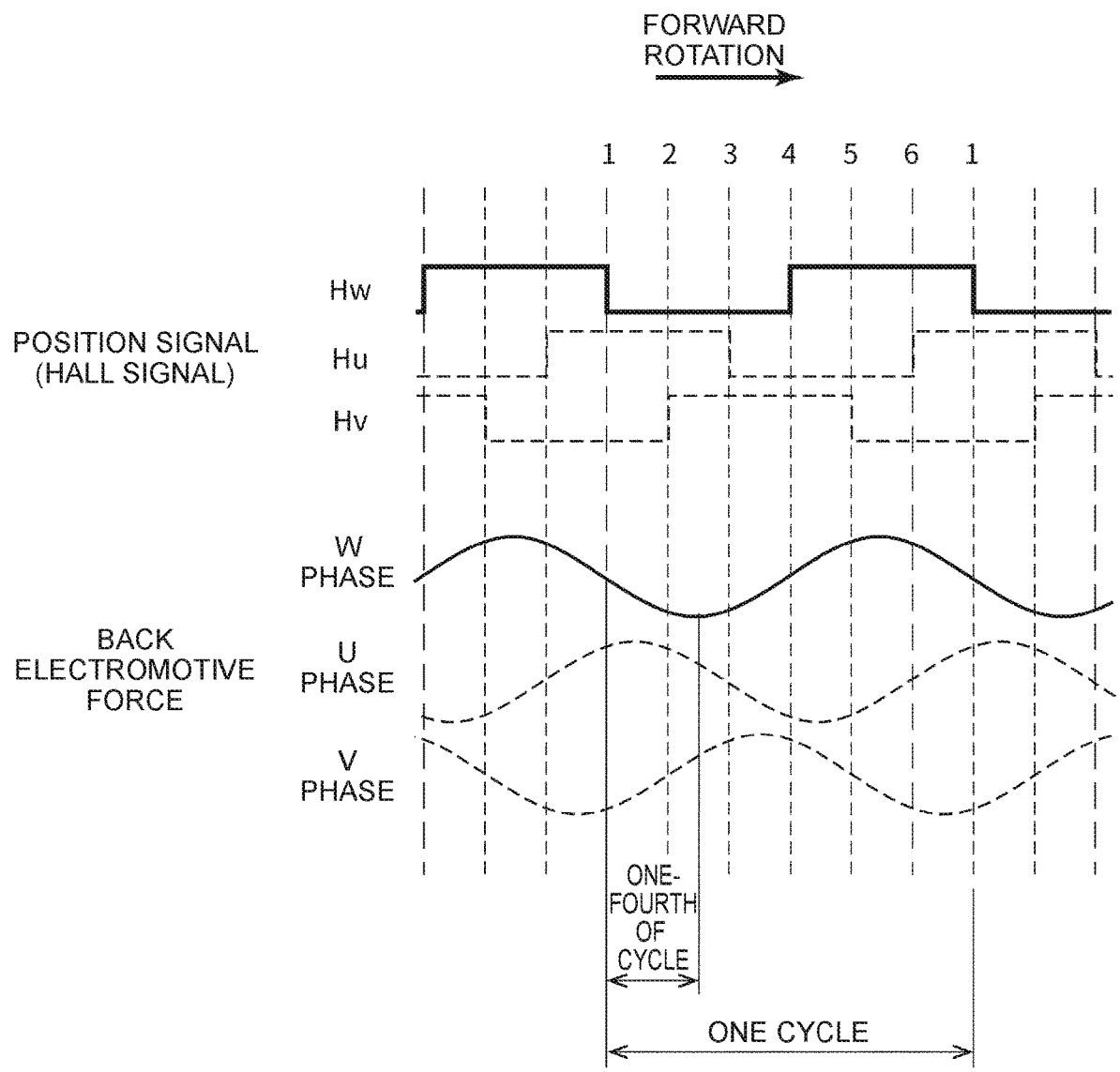
FIG. 2 schematically illustrates a relationship between a position signal and a back electromotive force.

FIG. 2 is a diagram schematically illustrating a relationship between the position signal Hw and the back electromotive force.

FIG. 2 illustrates respective transitions of the position signal Hw and the back electromotive force in the W phase when the motor 20 has not been energized and when the motor 20 is rotating forward. FIG. 2 illustrates for reference respective transitions of position signals when the position detectors corresponding to the U phase and the V phase are provided and respective transitions of the back electromotive forces in the U phase and the V phase, respectively, by broken lines. In the following description, it is presupposed that the position detector 6 is arranged such that the position signal Hw and the back electromotive force in the W phase at the time when the motor 20 is rotating forward have a relationship as illustrated in FIG. 2.

As illustrated in FIG. 2, in the present embodiment, with a fall timing (a timing indicated by a numeral "1" in FIG. 2) of the position signal Hw as a basis, values of the back electromotive force within a detection period from the fall timing to a timing after a lapse of a time period equal to a maximum of one-fourth of a cycle of the position signal Hw (the cycle of the position signal Hw may be hereinafter merely referred to as a cycle) are detected four times. A transition of values of the back electromotive force is detected by the voltage detection unit 43 based on the timing signal S2.

In the present embodiment, the detection period of the transition of the values of the back electromotive force is set by the control circuit unit 4. That is, the voltage detection unit 43 sets four detection timings based on the timing signal S2, and detects the back electromotive force at the detection timings. A time period between the first detection timing and the fourth detection timing in one cycle can be said to be the detection period of the transition of the values of the back electromotive force. The detection period of the transition of the values of the back electromotive force and the detection timings may be set by the timing signal generation unit 42. For example, the timing signal generation unit 42 may output the timing signal S2 at each of the detection timings, and the control circuit unit 4 may detect values of the back electromotive force every time the timing signal S2 is outputted.

The detection period of the transition of the values of the back electromotive force is set such that a length of the detection period becomes a length corresponding to the cycle of the position signal Hw. In other words, the detection timings are set such that a time period between the first detection timing and the fourth detection timing has the length corresponding to the cycle of the position signal Hw.

The detection period of the transition of the values of the back electromotive force is set to start after the fall timing of the position signal Hw and end before the time period equal to one-fourth of the cycle of the position signal Hw elapses. In other words, the detection timings are set such that the first detection timing is after the fall timing of the position signal Hw and the fourth detection timing is before a timing after a lapse of one-fourth of the cycle from the fall timing of the position signal Hw. The detection timings are set such that the time period between the first detection timing and the fourth detection timing does not exceed one-fourth of the cycle.

The detection timing may be set by dividing the cycle by a predetermined value. In this case, the detection timing of the back electromotive force may be appropriately set, for example, by changing the predetermined value used for the division depending on the cycle of the position signal Hw. For example, the predetermined value by which the cycle is divided is made large when the cycle is a relatively long, in order to make a ratio of the detection period of the transition of the values of the back electromotive force to the cycle significantly shorter than ¼ (e.g., set the ratio to one-sixth of the cycle or one-eighth of the cycle) so that an effect of settings of an advance angle and a retard angle of the motor 20 on determinations of a rotational state, described below, can be reduced and an effect of variation of an arrangement position of the position detector 6 can be reduced.

Figure 3:
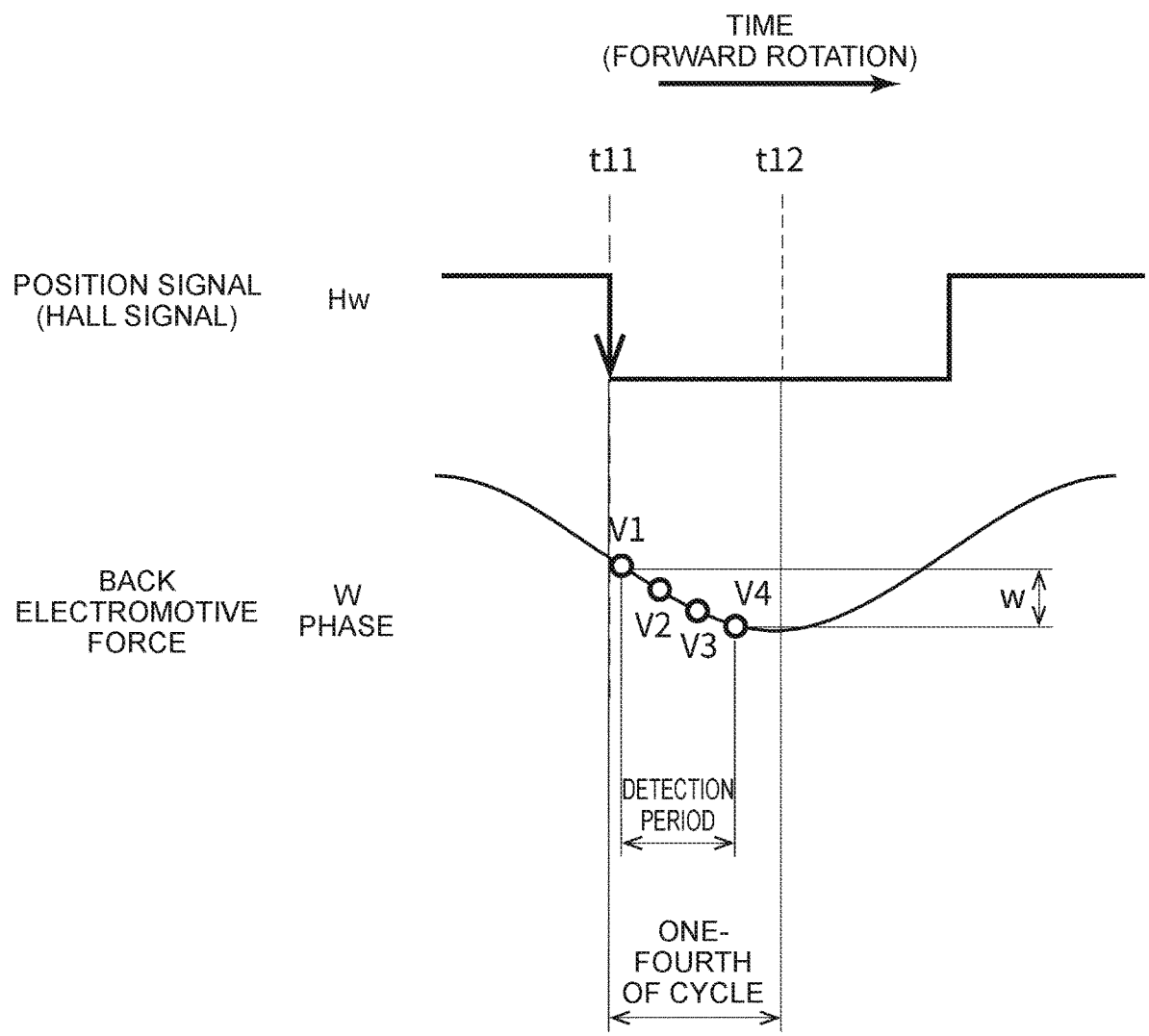
FIG. 3 is a diagram showing a relationship between the position signal and the back electromotive force when a motor is rotating forward.
Figure 4:
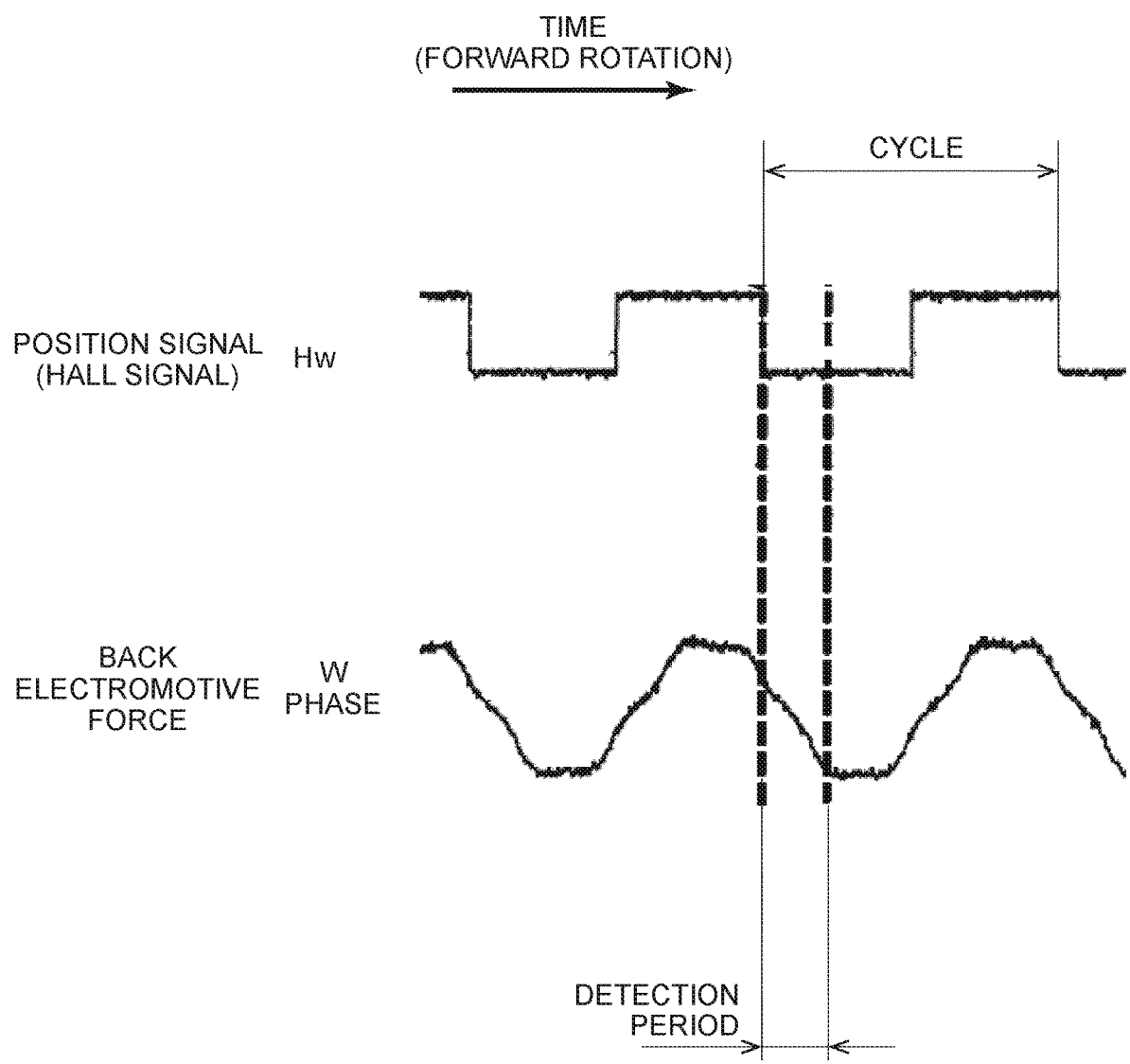
FIG. 4 is a graph illustrating an example of respective transitions of the position signal and the back electromotive force when the motor is rotating forward.

FIG. 3 is a diagram that shows a relationship between the position signal Hw and the back electromotive force when the motor 20 is rotating forward. FIG. 4 is a graph illustrating an example of respective transitions of the position signal Hw and the back electromotive force when the motor 20 is rotating forward.

In FIG. 3, a fall timing of the position signal Hw to be a basis for acquiring the back electromotive force values V1, V2, V3, and V4 is indicated as a time t11, and a timing after a lapse of one-fourth of the cycle is indicated as a time t12.

As illustrated in FIG. 3, a detection period of a transition of values of the back electromotive force is provided from the fall timing of the position signal Hw to the timing after a lapse of one-fourth of the cycle. In the detection period, values of the back electromotive force are detected at the first detection timing, the second detection timing, the third detection timing, and the fourth detection timing. As a result, the back electromotive force values V1, V2, V3, and V4 are acquired.

As illustrated in FIG. 4, when the motor 20 is rotating forward, values of the back electromotive force tend to decrease in a detection period of a transition of the values of the back electromotive force unless a noise, a disturbance, or the like contributes to the back electromotive force. That is, when the motor is rotating forward, the back electromotive force values V1, V2, V3, and V4 decrease as time elapses, and a relationship of V1>V2>V3>V4 is established. In other words, in the present embodiment, if the relationship of V1>V2>V3>V4 is established for the back electromotive force values V1, V2, V3, and V4, when a difference between the largest back electromotive force value V1 and the smallest back electromotive force value V4 (which may be hereinafter referred to as a back electromotive force value width w) is larger than a predetermined range, it can be determined that the motor 20 is rotating forward. When the back electromotive force value width w is within the predetermined range, it can be determined that the motor 20 is stopped.

Figure 5:
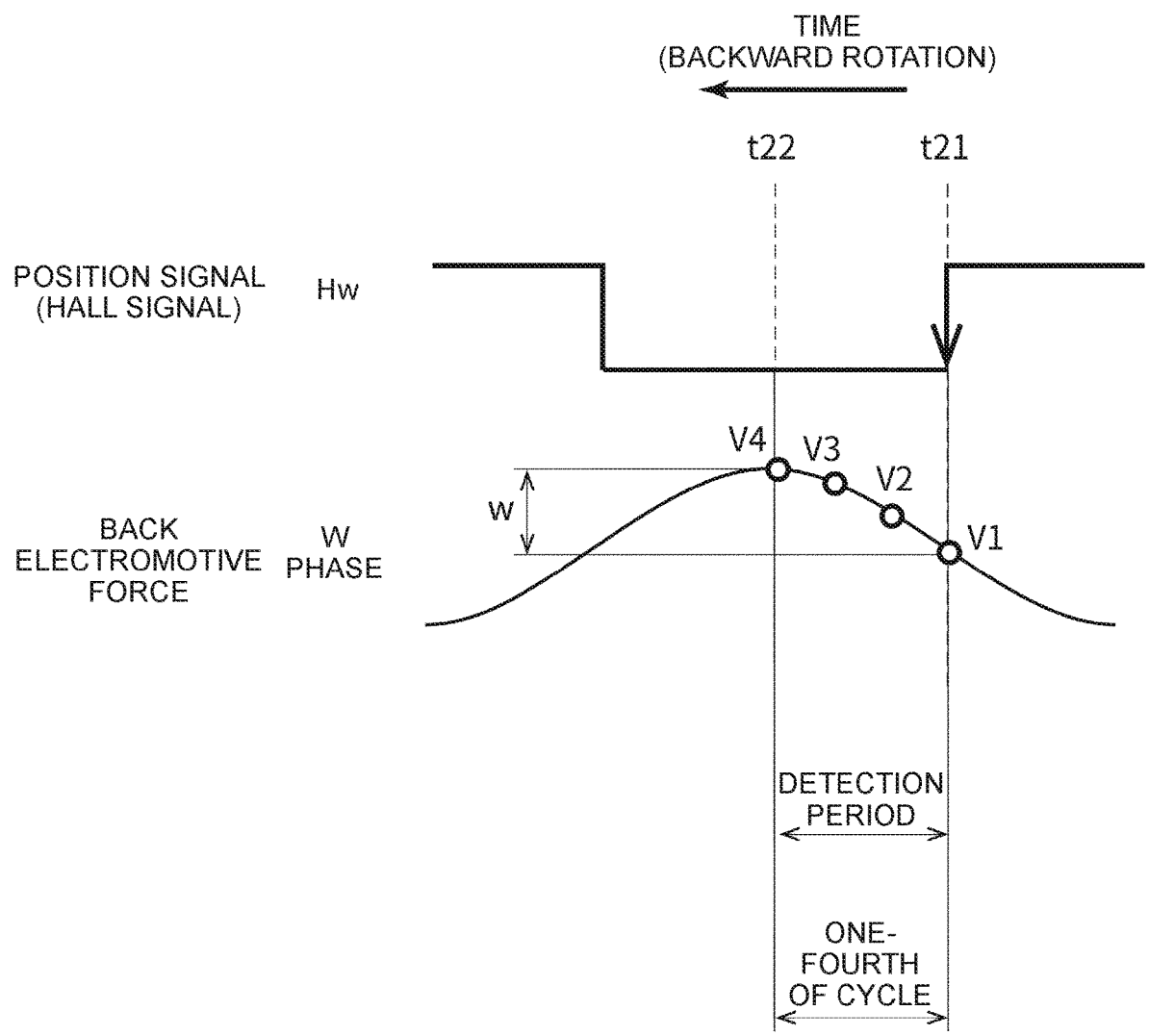
FIG. 5 is a diagram that shows a relationship between the position signal and the back electromotive force when the motor is rotating backward.
Figure 6:
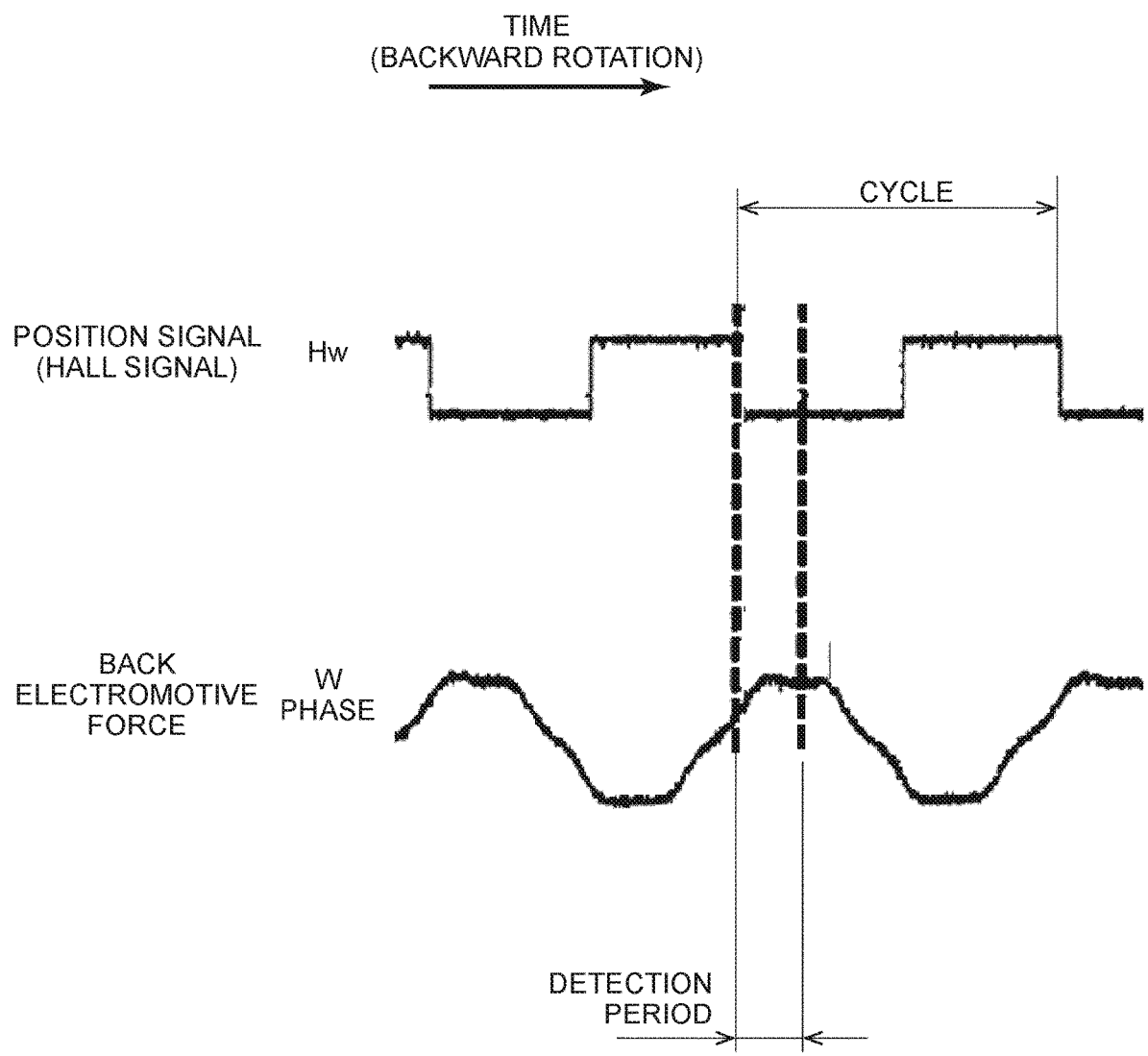
FIG. 6 is a graph illustrating an example of respective transitions of the position signal and the back electromotive force when the motor is rotating backward.

FIG. 5 is a diagram that shows a relationship between the position signal Hw and the back electromotive force when the motor 20 is rotating backward. FIG. 6 is a graph illustrating an example of respective transitions of the position signal Hw and the back electromotive force when the motor 20 is rotating backward.

In FIG. 5, a fall timing of the position signal Hw to be a basis for acquiring the back electromotive force values V1, V2, V3, and V4 is indicated as a time t21, and a timing after a lapse of one-fourth of the cycle is indicated as a time t22. In FIG. 5, a direction in which time elapses is illustrated to be opposite to that in FIG. 3 to correspond to the rotational direction of the motor 20. In FIG. 6, a direction in which time elapses is illustrated to be the same as that in FIG. 4.

In an example illustrated in FIG. 5, a detection period of a transition of values of the back electromotive force is also provided from a fall timing of the position signal Hw to a timing after a lapse of one-fourth of the cycle. In the detection period of the transition of the values of the back electromotive force, values of the back electromotive force are detected at the first detection timing, the second detection timing, the third detection timing, and the fourth detection timing. As a result, the back electromotive force values V1, V2, V3, and V4 are acquired. In FIG. 5, the first detection timing is the time t21, and the second detection timing is the time t22. That is, an example in which the detection period of the transition of the values of the back electromotive force is set longest compared to the cycle is illustrated.

As illustrated in FIG. 6, when the motor 20 is rotating backward, values of the back electromotive force tend to increase in a detection period of a transition of the values of the back electromotive force unless a noise, a disturbance, or the like contributes to the back electromotive force. That is, when the motor 20 is rotating backward, the back electromotive force values V1, V2, V3, and V4 increase with a lapse of time, and a relationship of V4>V3>V2>V1 is established. In other words, in the present embodiment, if the relationship of V4>V3>V2>V1 is established for the back electromotive force values V1, V2, V3, and V4, when a back electromotive force value width w as a difference between the largest back electromotive force value V4 and the smallest back electromotive force value V1 is larger than a predetermined range, it can be determined that the motor 20 is rotating backward. When the back electromotive force value width w is within the predetermined range, it can be determined that the motor 20 is stopped.

Figure 7:
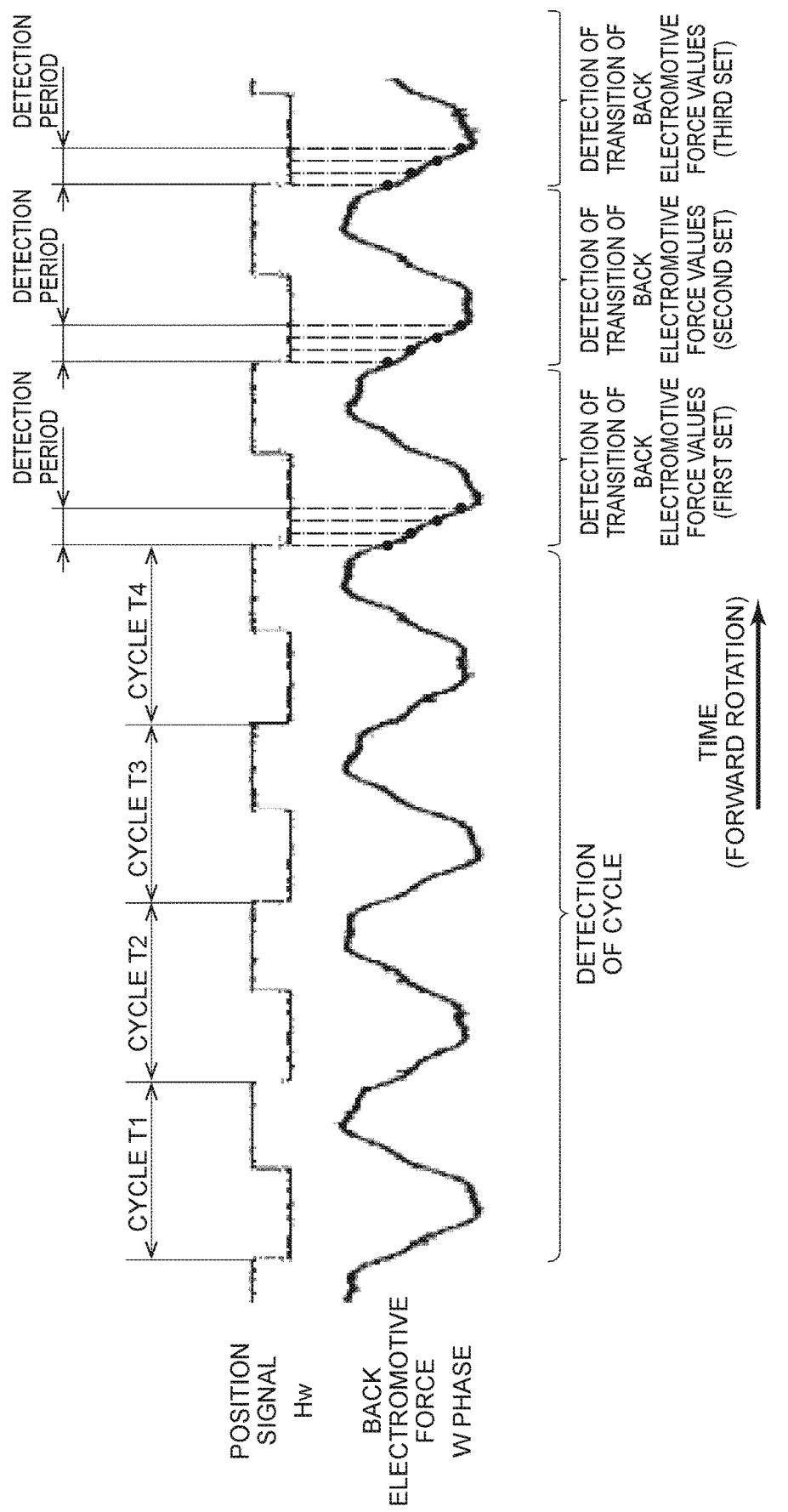
FIG. 7 is a graph illustrating an example of respective transitions of the position signal and the back electromotive force when startup of the motor is started.

FIG. 7 is a graph illustrating an example of respective transitions of the position signal Hw and the back electromotive force when startup of the motor 20 is started.

In FIG. 7, a case where the startup of the motor 20 is started when the motor 20 is rotating forward, for example, is illustrated. An example of each detection timing is indicated by a one-dot and dash line.

As illustrated in FIG. 7, the control circuit unit 4 detects a cycle of the position signal Hw based on the position signal Hw prior to detecting values of the back electromotive force. In the present embodiment, the control circuit unit 4 detects an average value of a continuous plurality of cycles (e.g., four cycles) of the position signal Hw (e.g., an average value (T1+T2+T3+T4)/4 of cycles T1, T2, T3, and T4 in FIG. 7) as the cycle of the position signal Hw. Although the voltage detection unit 43 detects the cycle of the position signal Hw based on the timing signal S2, for example, the present disclosure is not limited to this. The average value of the plurality of cycles is calculated as the cycle of the position signal Hw so that the cycle can be reliably calculated.

The control circuit unit 4 detects, when it begins the startup of the motor 20, a transition of values of the back electromotive force in each of a plurality of different detection periods, and determines a rotational state of the motor 20 based on a detection result of the transition of the values of the back electromotive force in each of the plurality of different detection periods. For example, the control circuit unit 4 measures the back electromotive force values V1, V2, V3, and V4 in one set and determines the rotational state of the motor 20 after a fall timing of the position signal Hw for each of the continuous three cycles. A determination result of the rotational state of the motor 20 is finally confirmed based on determination results respectively corresponding to the three cycles. Then, the control circuit unit 4 performs startup control for starting up the motor 20 using an energization system corresponding to the determination result of the rotational state finally confirmed.

Figure 8:
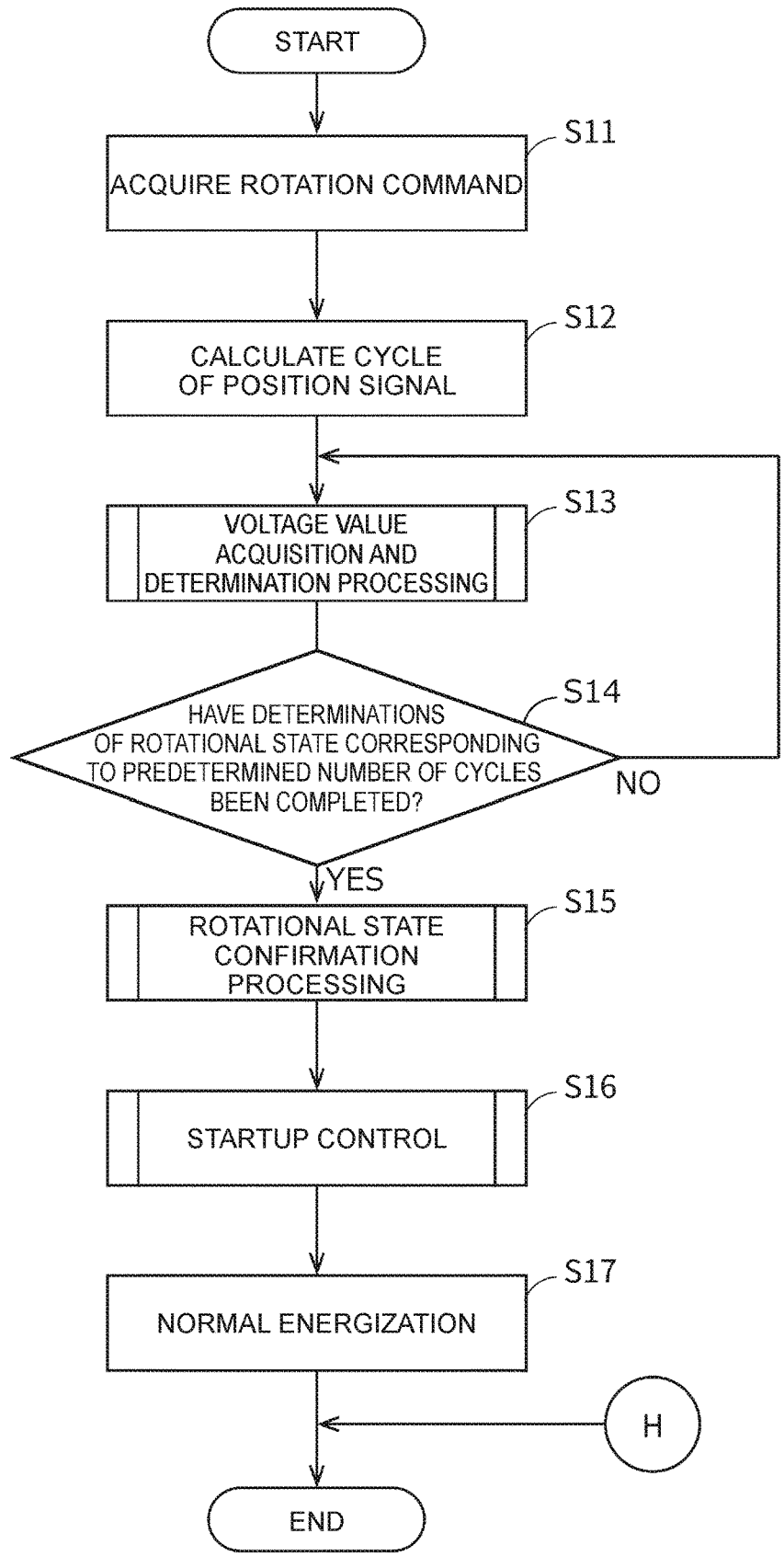
FIG. 8 is a flowchart illustrating an example of an operation of a control circuit unit.

FIG. 8 is a flowchart illustrating an example of an operation of the control circuit unit 4.

As illustrated in FIG. 8, when the control circuit unit 4 acquires a rotation command to rotate the motor 20 in step S11, the control circuit unit 4 starts a startup start operation in steps S12 to S16.

In step S12, the voltage detection unit 43 calculates a cycle of the position signal Hw based on the timing signal S2. As a result, the voltage detection unit 43 can set a detection timing.

In step S13, the voltage detection unit 43 and the voltage transition calculation unit 44 perform voltage value acquisition and determination processing.

Figure 9:
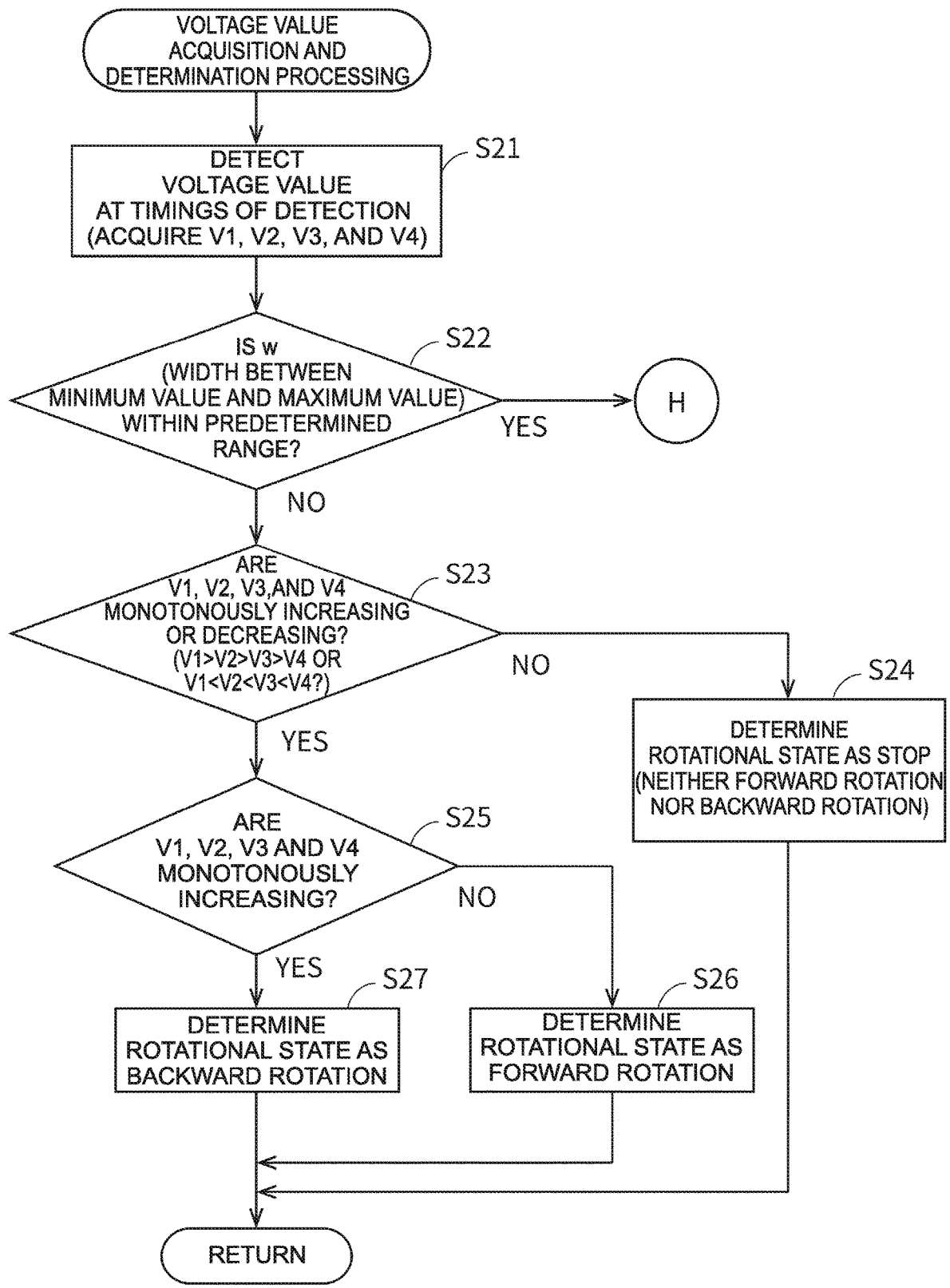
FIG. 9 is a flowchart for describing the voltage value acquisition and determination processing.

FIG. 9 is a flowchart illustrating the voltage value acquisition and determination processing.

As illustrated in FIG. 9, in step S21, the voltage detection unit 43 detects a value of voltage outputted from the voltage dividing circuit 5 at set four detection timings, to acquire values of the back electromotive force. The acquired back electromotive force values V1, V2, V3, and V4 are sequentially fed as the detection voltage information S3 to the voltage transition calculation unit 44 and are held in the storage unit of the voltage transition calculation unit 44.

In step S22, the voltage transition calculation unit 44 calculates a back electromotive force value width w based on the back electromotive force values V1, V2, V3, and V4. The voltage transition calculation unit 44 determines whether or not the back electromotive force value width w is within a predetermined range. If the back electromotive force value width w is not within the predetermined range (NO), the process proceeds to step S23. If the back electromotive force value width w is within the predetermined range (YES), the control circuit unit 4 finishes a series of processes illustrated in FIG. 8. The control circuit unit 4 may perform another process, for example, perform control to perform initial energization after performing short braking as startup control (step S16), described below. An appropriate value can be set for each motor as the predetermined range.

In step S23, the voltage transition calculation unit 44 determines whether the back electromotive force values V1, V2, V3, and V4 are monotonously increasing or decreasing or are neither monotonously increasing nor decreasing. If a relationship of a monotonous increase (V1>V2>V3>V4) is established or if a relationship of a monotonous decrease (V4>V3>V2>V1) is established (YES), the process proceeds to step S25. If neither the relationship of the monotonous increase nor the relationship of the monotonous decrease is established (NO), the process proceeds to step S24.

In step S24, the voltage transition calculation unit 44 determines that the rotational state of the motor 20 is stopped. The term stopped rotational state signifies a rotational state where the motor 20 is determined to be neither rotating forward nor rotating backward, and is not necessarily limited to a state where the rotor has been strictly braked. The voltage transition calculation unit 44 outputs a determination result as the calculation information S4 to the energization system command unit 45.

In step S25, the voltage transition calculation unit 44 determines whether or not the back electromotive force values V1, V2, V3, and V4 are monotonously increasing. If a relationship of a monotonous increase (V1>V2>V3>V4) is established (YES), the process proceeds to step S27. If the relationship of the monotonous increase (V1>V2>V3>V4) is not established (i.e., a relationship of a monotonous decrease (V4>V3>V2>V1) is established (NO), the process proceeds to step S26.

In step S26, the voltage transition calculation unit 44 determines that the rotational state of the motor 20 is forward rotation. The voltage transition calculation unit 44 outputs a determination result as the calculation information S4 to the energization system command unit 45.

In step S27, the voltage transition calculation unit 44 determines that the rotational state of the motor 20 is backward rotation. The voltage transition calculation unit 44 outputs a determination result as the calculation information S4 to the energization system command unit 45.

When any one of steps S24, S26, and S27 ends, the back electromotive force value acquisition and determination processing in the cycle end, and the processing returns to the processing illustrated in FIG. 8.

Referring to FIG. 8 again, in step S14, the voltage transition calculation unit 44 determines whether or not determinations of the rotational state corresponding to a predetermined number of cycles (e.g., three cycles) have been completed. If the determinations have been completed (YES), the process proceeds to step S15. If the determinations have not been completed (NO), the processing returns to step S13.

In step S15, rotational state confirmation processing is performed.

Figure 10:
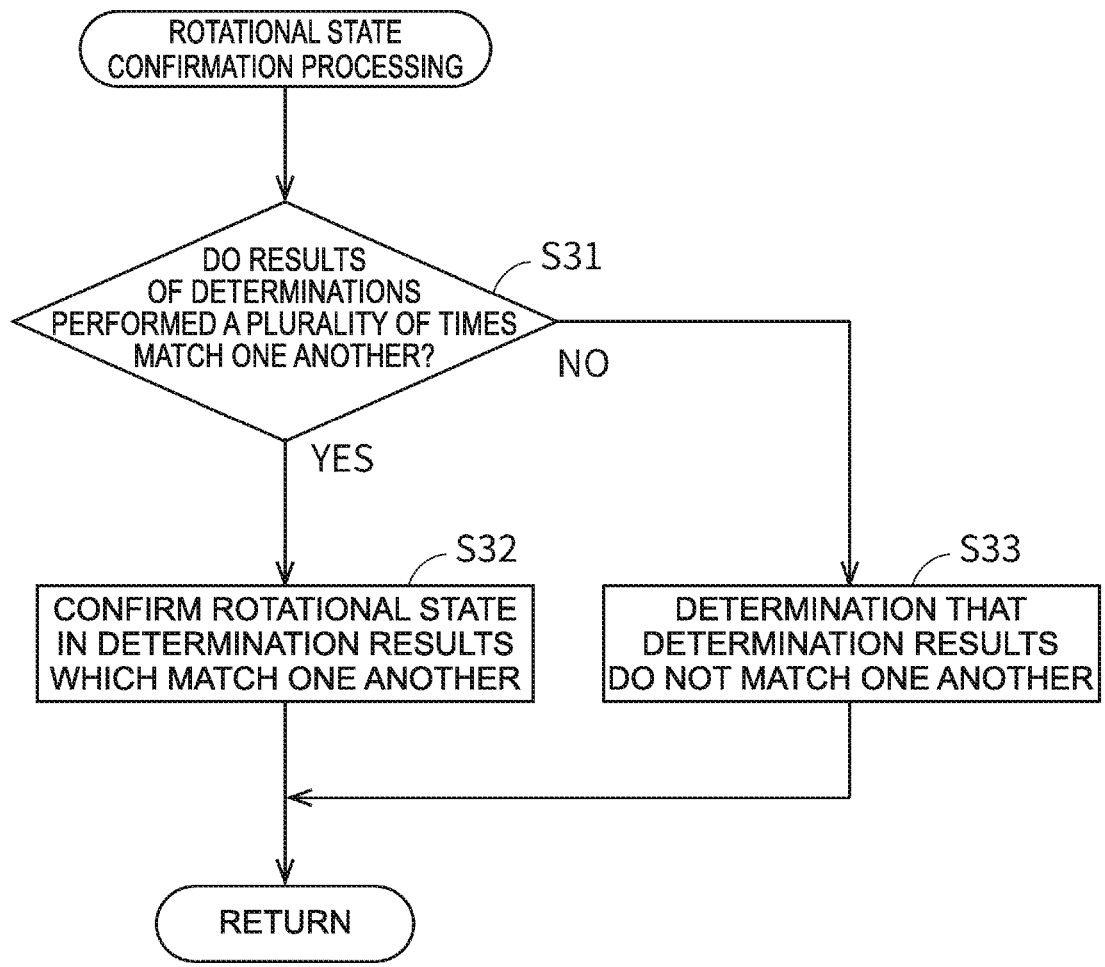
FIG. 10 is a flowchart illustrating rotational state confirmation processing.

FIG. 10 is a flowchart illustrating the rotational state confirmation processing.

As illustrated in FIG. 10, if the rotational state confirmation processing is started, then in step S31, the energization system command unit 45 determines whether or not results of determination performed a plurality of times (e.g., three times) obtained until then match one another. If the determination results match one another (YES), the process proceeds to step S32. If the determination results do not match one another (NO), the process proceeds to step S33.

In step S32, the energization system command unit 45 confirms the determination results which have matched one another as a final determination result of the rotational state of the motor 20.

On the other hand, in step S33, the energization system command unit 45 confirms non-coincidence of the determination results of the rotational state of the motor 20 as a determination result.

When either one of steps S32 and S33 ends, the rotational state confirmation processing ends, and the processing returns to the processing illustrated in FIG. 8.

Referring to FIG. 8 again, in step S16, startup control is performed.

Figure 11:
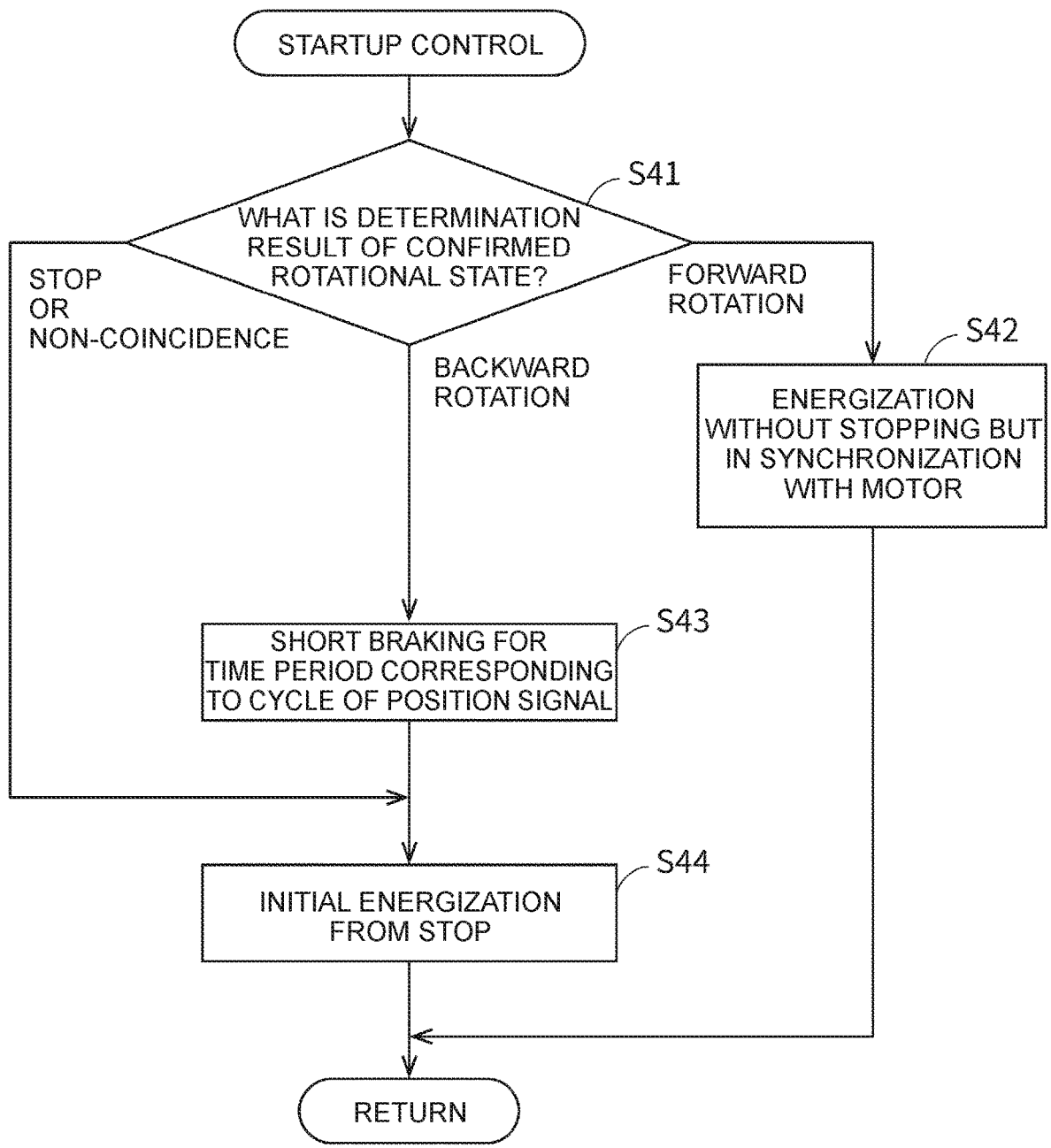
FIG. 11 is a flowchart illustrating startup control.

FIG. 11 is a flowchart illustrating the startup control.

As illustrated in FIG. 11, in step S41, the energization system command unit 45 determines a determination result of the rotational state confirmed by the rotational state confirmation processing. If the determination result is "forward rotation", the process proceeds to step S42. If the determination result is "backward rotation", the process proceeds to step S43. If the determination result is neither the forward rotation nor the backward notation (if the determination result in the back electromotive force value acquisition and determination processing is "stop" or if the determination result in the rotational state confirmation processing is "non-coincidence"), the process proceeds to step S44.

In step S42, the energization system command unit 45 outputs the energization command signal S5 to the energization signal generation unit 46 to drive the motor 20 using an energization system for energizing the motor 20 without stopping but in synchronization with the motor 20. Consequently, the energization signal generation unit 46 outputs the driving control signal S6 such that an energization phase is switched for each predetermined time period and a switching cycle of the energization phase gradually decreases, for example. As a result, the rotation of the motor 20 and the energization phase can be quickly synchronized with each other with the motor 20 rotating in a forward rotational direction.

In the present embodiment, the switching cycle of the energization phase is set to be a time period corresponding to the cycle of the position signal Hw calculated in step S12. More specifically, if the cycle is relatively short, e.g., if the cycle is shorter than the predetermined time period, the motor 20 may conceivably remain rotating forward at a relatively high speed. Thus, energization is started from a state where the switching cycle of the energization phase is relatively short. On the other hand, if the cycle is relatively long, e.g., if the cycle is longer than the predetermined time period, the motor 20 may conceivably remain rotating at a relatively low speed. Thus, the energization is started from a state where the switching cycle of the energization phase is relatively long. When the switching cycle of the energization phase is thus appropriately set depending on the rotational speed at the time of the forward rotation of the motor 20, the rotation of the motor 20 can be quickly synchronized with the energization phase so that the motor can be quickly started up.

In step S43, the energization system command unit 45 outputs the energization command signal S5 to the energization signal generation unit 46 such that short braking is applied as the energization system. Accordingly, the energization signal generation unit 46 outputs the driving control signal S6 to stop the motor 20.

In the present embodiment, a time period during which short braking is applied is set to be a time period corresponding to the cycle of the position signal Hw calculated in step S12. More specifically, if the cycle is relatively short, e.g., if the cycle is shorter than the predetermined time period, the motor 20 may conceivably remain rotating backward at a relatively high speed. Thus, the short braking is applied for a relatively long time period. On the other hand, if the cycle is relatively long, e.g., if the cycle is longer than the predetermined time period, the motor 20 may conceivably remain rotating backward at a relatively low speed. Thus, the short braking is applied for a relatively short time period. When a time period during which the short braking is thus applied is appropriately set depending on the rotational speed at the time of backward rotation of the motor 20, the motor 20 can be quickly stopped.

In step S44, the energization system command unit 45 outputs the energization command signal S5 to the energization signal generation unit 46 to perform initial energization from a stopped state. The energization signal generation unit 46 performs an initial energization operation by outputting the driving control signal S6, to start to rotate the motor 20 in the forward rotational direction and gradually accelerate the rotation of the motor 20.

If either one of steps S42 and S44 ends, the startup control ends, and the processing returns to the processing illustrated in FIG. 8.

Referring to FIG. 8 again, in step S17, normal driving is performed from a state where the startup control ends. That is, the driving control signal S6 is outputted based on the speed command signal and the position signal Hw from the energization signal generation unit 46 so that single sensor driving of the motor 20 is performed. When the normal driving ends, a series of processes ends.

As described above, in the present embodiment, the rotational state of the motor 20 can be accurately determined at the time of the startup of the motor 20 using only the one position detector 6. If the motor 20 is in a forward rotational state where it need not be stopped, the motor 20 can be started up as it is without being stopped once by applying short braking. Therefore, the motor 20 can be quickly started up in the forward rotational direction. On the other hand, if the motor 20 remains rotating backward, the motor 20 can be stopped once. Therefore, if the motor 20 is not in the forward rotational state, the motor 20 can be reliably started up by being initially energized from a stopped state. A special circuit configuration for determining the rotational direction of the motor 20 need not be adopted. Thus, a manufacturing cost of the motor 20 can be kept low.

The rotational state of the motor 20 is determined based on a result obtained by detecting the back electromotive force a plurality of times in one cycle. Therefore, a transition of values of the back electromotive force is accurately ascertained so that the rotational state can be easily determined with high accuracy. A determination result of the rotational state of the motor 20 is confirmed based on a detection result of respective transitions of the values of the back electromotive force corresponding to a plurality of cycles. Therefore, a determination accuracy of the rotational state can be improved.

The cycle of the position signal Hw is found as an average value of a predetermined number of cycles. Therefore, the rotational speed of the motor 20 can be detected with high accuracy. When the motor 20 is rotating backward, a time period during which subsequent short braking is implemented can be accurately set. When the motor 20 is rotating forward, a switching cycle of an energization phase in subsequent synchronization processing can be accurately set.

Others

A motor driving control device is not limited to circuit configurations respectively illustrated in the above-described embodiment and its variant. Various circuit configurations adapted for purposes of the present disclosure can be used.

A phase in which a position detector is arranged is not limited to a specific phase. A phase in which a back electromotive force is detected is not limited to a specific phase. With a rise timing of a position signal or another timing as a basis, a back electromotive force may be detected, and a rotational state may be determined. For example, an arrangement position of the position detector may be such that values of the back electromotive force tend to increase at the time of forward rotation. The position detector is desirably arranged at a position where a change timing of the position signal is in the vicinity of a zero cross point of a back electromotive force in a phase to be detected. The position detector is desirably arranged at a position in consideration of occurrence of a shift due to an advance angle or a retard angle of the motor 20.

A motor which is driven by the motor driving control device according to the present embodiment is not limited to a three-phase brushless motor, but may be various motors each including coils with a plurality of phases equal to or more than two phases.

The above-described flowcharts illustrate one example for describing an operation, and the present disclosure is not limited to this. Steps illustrated in each of the flowcharts are exemplary and are not limited to the flow. For example, the order of the steps may be changed, another processing may be inserted between the steps, or processing may be parallelized.

A part of the whole of the processing in the above-described embodiment may be performed by software, or may be performed using a hardware circuit. For example, the control circuit unit is not limited to a microcomputer. At least some of the components inside the control circuit unit may be processed by software.

It should be understood that the above-described embodiment is illustrative and is nonrestrictive in all respects. The scope of the present disclosure is illustrated not by the foregoing description but by the scope of the claims, and is intended to include meanings equivalent to the scope of the claims and all variations within the scope.

What is claimed is:
1. A motor driving control device comprising:
a motor driving unit configured to selectively energize coils with a plurality of phases of a motor;
a control circuit unit configured to control an operation of the motor driving unit by outputting a driving control signal to the motor driving unit; and a magnetic sensor provided at a position corresponding to any one phase of the plurality of phases and configured to output a position signal whose phase changes depending on a positional relationship between the one phase of the plurality of phases and a rotor of the motor to the control circuit, a voltage dividing circuit electrically connected between an energization line to any one phase of the plurality of phases and a ground and configured to output a potential corresponding to a back electromotive force generated in the one phase to the control circuit when the energization by the motor driving unit is not performed, wherein the control circuit unit includes;

a timing signal generation unit configured to set a detection period corresponding to a timing of a change of the position signal being input from the magnetic sensor when beginning to start up the motor such that a length of the detection period becomes a length corresponding to a cycle of the position signal, a voltage detection unit configured to detect a plurality of values of the back electromotive force based on the potential corresponding to the back electromotive force inputted from the voltage dividing circuit during the detection period corresponding to the timing of the change of the position signal, a voltage transition calculation unit configured to determine whether the motor is rotating forward, is rotating backward, or is neither rotating forward nor rotating backward based on whether the values of the detected back electromotive force tend to increase, tend to decrease, or neither tend to increase nor tend to decrease in the detection period.

2. The motor driving control device according to claim 1, wherein the timing signal generation unit sets the detection period to start after the change of the position signal and end before a time period equal to one-fourth of the cycle of the position signal elapses.

3. The motor driving control device according to claim 1, wherein the timing signal generation unit sets an average value of a continuous plurality of cycles of the position signal to the cycle of the position signal.

4. The motor driving control device according to claim 1, wherein the voltage transition calculation unit detects the transition of the values of the back electromotive force in each of a plurality of different detection periods when beginning to start up the motor, and determines a rotational state of the motor based on a detection result of the transition of the values of the back electromotive force in each of the plurality of different detection periods.

5. The motor driving control device according to claim 1, wherein the control circuit unit further includes a energization system command unit configured to determine a driving control method subsequently performed based on a determination result of the rotational state of the motor.

6. A motor driving control method for a motor having coils with a plurality of phases, the motor driving control method comprising:

a step for setting a detection period corresponding to a timing of a change of a position signal which is output from a magnetic sensor provided at a position corresponding to any one of the plurality of phases and whose phase changes depending on a positional relationship between the one phase of the plurality of phases and a rotor of the motor when beginning to start up the motor such that a length of the detection period becomes a length corresponding to a cycle of the position signal;

a voltage dividing step for outputting a potential corresponding to a back electromotive force generated in the one phase when an energization by the motor driving unit is not performed;

a back electromotive force detection step for detecting a plurality of values of the back electromotive force induced in the one phase during the detection period based on the potential corresponding to the back electromotive force inputted in the voltage dividing step during the detection period corresponding to the timing of the change of the position signal; and a rotational state determination step for determining whether the motor is rotating forward, is rotating backward, or is neither rotating forward nor rotating backward based on whether the plurality of the values of the back electromotive force detected in the back electromotive force detection step tend to increase, tend to decrease, or neither tend to increase nor tend to decrease in the detection period.

* * * * *